United States Patent
Palazzi et al.

(10) Patent No.: US 6,481,416 B2
(45) Date of Patent: Nov. 19, 2002

(54) METHOD FOR CORRECTION OF THE SPARK ADVANCE FOR AN INTERNAL COMBUSTION ENGINE WITH A CONTINUOUS PHASE TRANSFORMER AT THE INTAKE AND/OR EXHAUST

(75) Inventors: Alessandro Palazzi, Bologna; Paolo Spinelli, Imola, both of (IT); Jean Charles Minichetti, Nanterre (FR)

(73) Assignee: Magneti Marelli Powertrain S.p.A. (IT)

( * ) Notice: Subject to any disclaimer, the term of this patent is extended or adjusted under 35 U.S.C. 154(b) by 0 days.

(21) Appl. No.: 09/983,596

(22) Filed: Oct. 25, 2001

(65) Prior Publication Data

US 2002/0056437 A1 May 16, 2002

(30) Foreign Application Priority Data

Oct. 27, 2000 (IT) ........................................ BO00A0624

(51) Int. Cl.⁷ .................................................. F02P 5/00
(52) U.S. Cl. .............................. 123/406.23; 123/406.44
(58) Field of Search ....................... 123/406.23, 406.44, 123/406.12, 406.19, 406.48, 568.11

(56) References Cited

U.S. PATENT DOCUMENTS

| | | | |
|---|---|---|---|
| 4,622,939 | A | 11/1986 | Mazekunas |
| 5,577,476 | A | 11/1996 | Iyoda |
| 5,974,870 | A | 11/1999 | Treinies et al. |
| 6,062,204 | A | 5/2000 | Cullen |

FOREIGN PATENT DOCUMENTS

DE    19844085    3/2000

*Primary Examiner*—Bibhu Mohanty
(74) *Attorney, Agent, or Firm*—Hall, Priddy, Myers & Vande Sande

(57) ABSTRACT

Method for correction of the spark advance for an internal combustion engine with a continuous phase transformer at the intake and/or exhaust; for each cylinder, the method consists of calculating a theoretical value of the optimum spark advance according to the drive point, calculating a first correction value, which depends on the mass of burnt gas-trapped in the cylinder at the end of the intake phase, calculating a second correction value, which depends on the torque value generated, and calculating the actual value of the spark advance, by adding the two correction values to the theoretical value of the spark advance.

10 Claims, 2 Drawing Sheets

METHOD FOR CORRECTION OF THE SPARK ADVANCE FOR AN INTERNAL COMBUSTION ENGINE WITH A CONTINUOUS PHASE TRANSFORMER AT THE INTAKE AND/OR EXHAUST

The present invention relates to a method for correction of the spark advance for an internal combustion engine with a continuous phase transformer at the intake and/or exhaust.

BACKGROUND OF THE INVENTION

As is known, in an endothermic engine, the optimum spark advance depends on the speed of rotation and on the engine load (which, in systems with combustion with a stoichiometric mixture ratio, depends on the mass of air collected during the intake phase). Combustion primed with optimum spark advance corresponds to the maximum torque generation (excluding the occurrence of detonating phenomena), whereas combustion primed with any other advance corresponds to deterioration of the combustion performance.

In addition to the mass of air collected during the intake phase, the quantity of residual burnt gas (which is trapped inside the cylinder at the end of the exhaust phase, and is altogether inert as far as combustion is concerned) plays a determining part in definition of the optimum advance, since both the quantity and quality of the fuel present in the cylinder at the end of the intake phase affect the speed of propagation of the flame front and the combustion temperature. In particular, the speed of propagation of the flame front (which affects in a determining manner the spark advance applicable) for the same new mass (of air) collected, is reduced as the percentage of burnt gas present in the combustion chamber increases.

The presence of a continuous phase transformer at the intake/exhaust modifies both the quantity and quality of the fuel collected, and thus the speed of propagation of the flame front. In fact, in engines which have intake/exhaust timing devices with continuous transformation, for the same engine rotation speed it is possible to obtain the same quantity of mass of air collected in the cylinder, with different intake/exhaust timing values, and the different intake/exhaust timing values correspond to a different mass of inert gas which is trapped in the cylinder at the end of the exhaust phase.

From the foregoing information it is apparent that in order to determine a correct value of the advance to be applied, it is necessary to take into account also the mass of inert gas which is trapped in the cylinder at the end of the intake phase. In the known internal combustion engines, use is made of mapping (or dimensioned plans), which are determined in the design phase, are stored in a memory of a control unit, and can supply the correct value of the advance according to the drive point (which is defined by the speed of rotation and by the engine load), and according to the intake/exhaust timings (which are contained within their minimum and maximum values).

However, the use of the aforementioned mapping is particularly costly, since, in order to be stored in the control unit of the engine, this mapping requires a quantity of memory which is relatively very high. In addition, the logic used for this mapping is completely different from the logic implemented by the control unit of engines with an external EGR circuit (i.e. with an external fuel gas recirculation circuit), and therefore the development of this mapping cannot borrow in any way from the knowledge developed during the design of the engine control logic with an external EGR circuit, a fact which is clearly a requirement for more time during the design and adjustment stage.

SUMMARY OF THE INVENTION

The object of the present invention is to provide a method for correction of the spark advance for an internal combustion engine with a continuous phase transformer at the intake and/or exhaust, which is free from the above-described disadvantages, and in particular is easy and economical to implement.

According to the present invention, a method is provided for correction of the spark advance for an internal combustion engine with a continuous phase transformer at the intake and/or exhaust, as described in claim 1.

BRIEF DESCRIPTION OF THE DRAWINGS

The present invention will now be described, with reference to the attached drawings, which illustrate a non-limiting embodiment of it, in which.

DETAILED DESCRIPTION OF THE INVENTION

Figure 1:
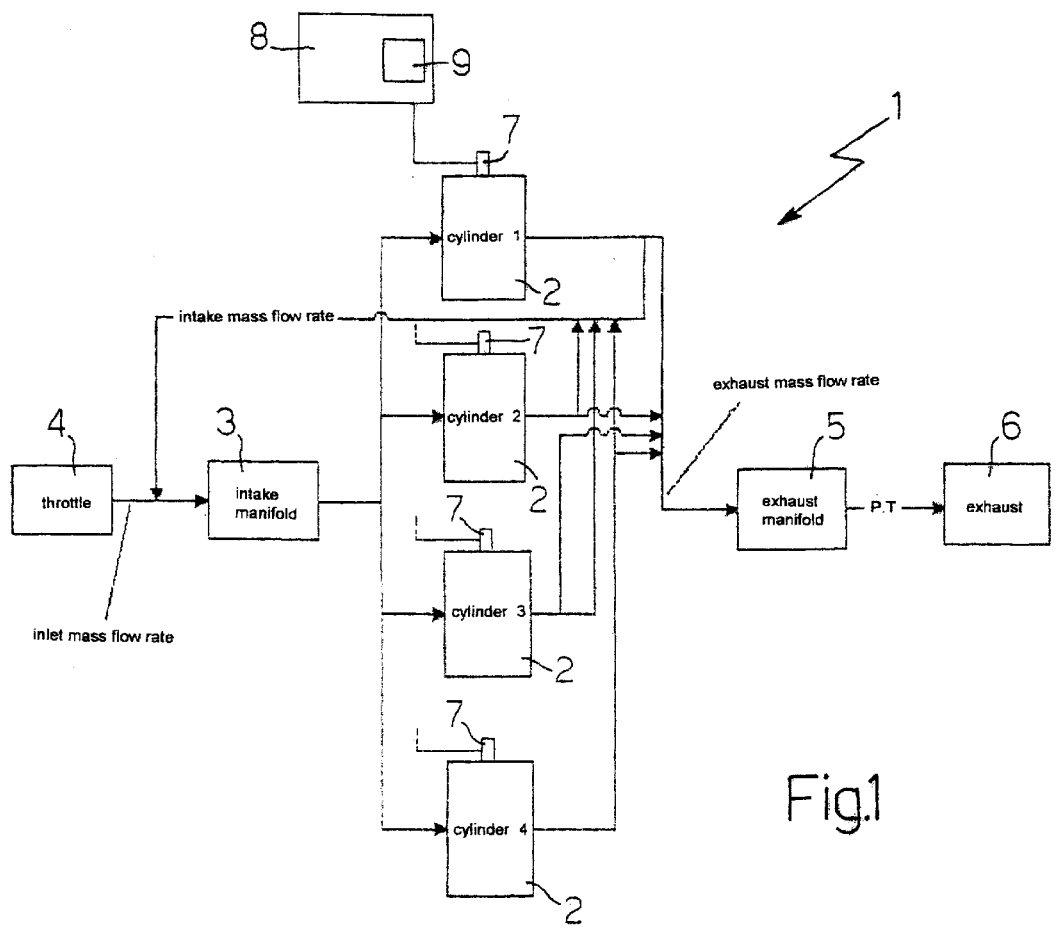
FIG. 1 is a block diagram of modelling of an internal combustion engine.

In FIG. 1, 1 indicates as a whole an internal combustion engine with a continuous phase transformer of a known type at the intake and/or exhaust; in FIG. 1, the engine 1 is represented by means of modelling illustrated by a block diagram, and is known according to the literature.

The engine 1 comprises four cylinders 2 (represented by the blocks identified by the term "cylinder"), which are connected by means of respective intake valves (not illustrated) to an intake manifold 3 (represented by the block identified by the term "intake manifold") which is regulated by a respective butterfly valve 4 (represented by the block identified by the term "throttle"), and are connected by means of respective exhaust valves (not illustrated) to an exhaust manifold (represented by the block identified by the term "exhaust manifold"), connected to an exhaust device 6 for the burnt gases (represented by the block identified by the term "exhaust"). Each cylinder 2 is provided with a respective spark plug 7, which is controlled by a control system 8, and can give rise in a known manner to sparking of the compressed gases inside the respective cylinder 2, on completion of the compression stage.

As illustrated in the modelling in FIG. 1, part (identified by the term "intake mass flow rate") of the gases discharged from the cylinders 2 is re-admitted into the intake manifold 3, whereas the remaining part (identified by the term "exhaust mass flow rate") of the gases discharged from the cylinders 2 is admitted into the exhaust manifold 5. In addition, the intake manifold receives a quantity of new air (identified by the term "inlet mass flow rate"), via the butterfly valve 4.

The control system 8 is provided with a calculation unit 9, which, in use, can calculate for each cylinder 2 a respective actual value AAeff of the spark advance, such as to obtain from the cylinder 2 itself the maximum performance corresponding to the maximum generation of torque (excluding the occurrence of detonating phenomena).

Figure 2:
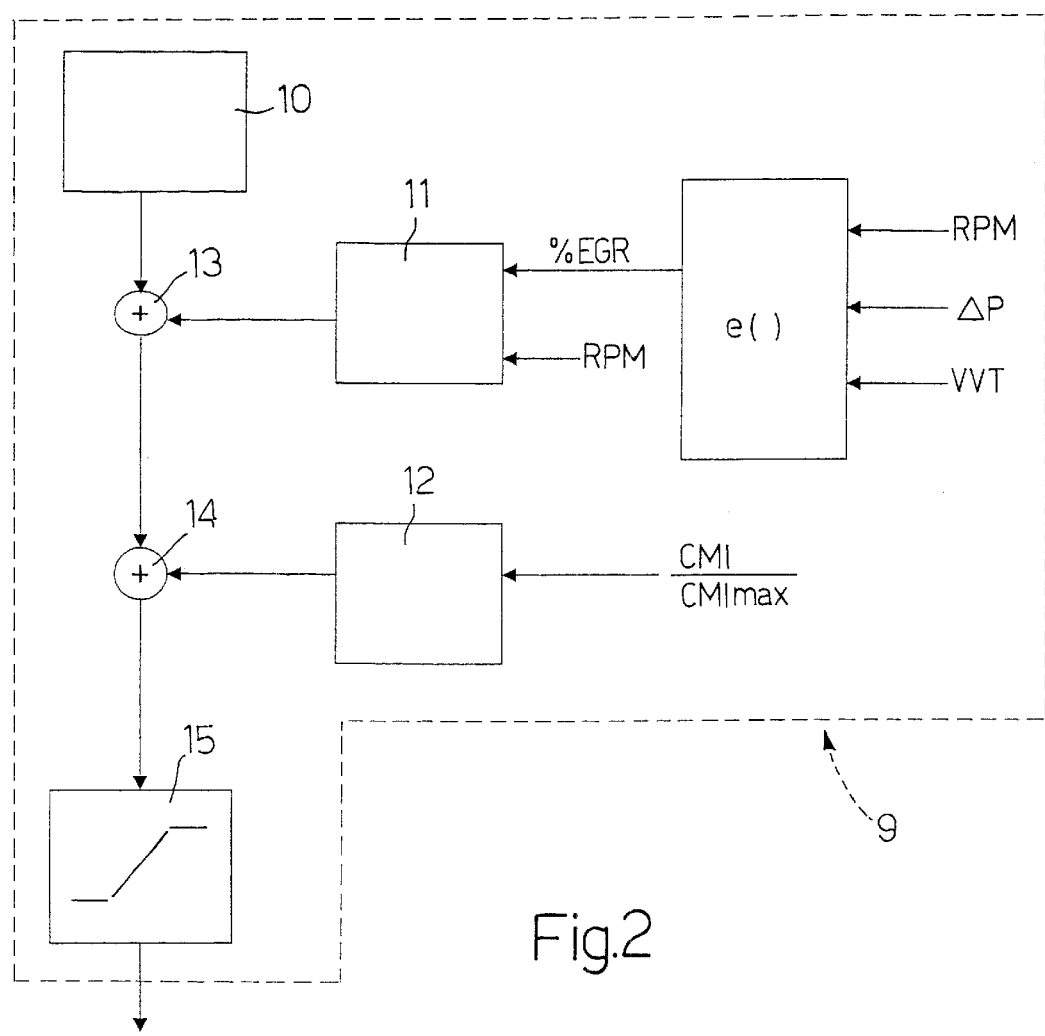
FIG. 2 is a block diagram of a calculation unit which operates according to the method which is the subject of the present invention.

As illustrated in FIG. 2, the calculation unit 9 comprises a calculation block 10, which can calculate in a known manner for each cylinder 2 a respective theoretical value AAth of the spark advance, according to the current drive point. The calculation unit 9 additionally comprises two calculation blocks 11 and 12, which can calculate respectively two values AAC1 and AAC2 of correction of the spark advance; the correction values AAC1 and AAC2 are added algebraically to the theoretical value AAth, by means of two respective adding blocks 13 and 14, in order to obtain an actual value Aaeff of the spark advance.

Before being applied to the engine 1, the actual spark advance value Aaeff is processed by means of a saturation function, which is implemented in a saturation block 15, in order to keep the actual value Aaeff itself within a limited interval, either below (minimum value) or above (maximum value).

The correction value AAC1 is calculated in the respective calculation block 11, according to the speed of rotation RPM of the engine 1, and according to the mass % EGR of burnt gas trapped in the cylinder 2 at the end of the intake stage; the mass % EGR of burnt gas is conventionally expressed as a percentage in relation to the total mass of gas present in the cylinder 2 at the end of the intake phase. The calculation block 11 can associate with each pair of values of speed of rotation RPM/mass % EGR of burnt gas a respective correction value AAC1, according to methodologies which are known, since they are altogether similar to those used in internal combustion engines which are provided with an external EGR circuit, i.e. with a external combustion gas recirculation circuit (EGR=Exhaust Gas Recirculation).

Figure 4:
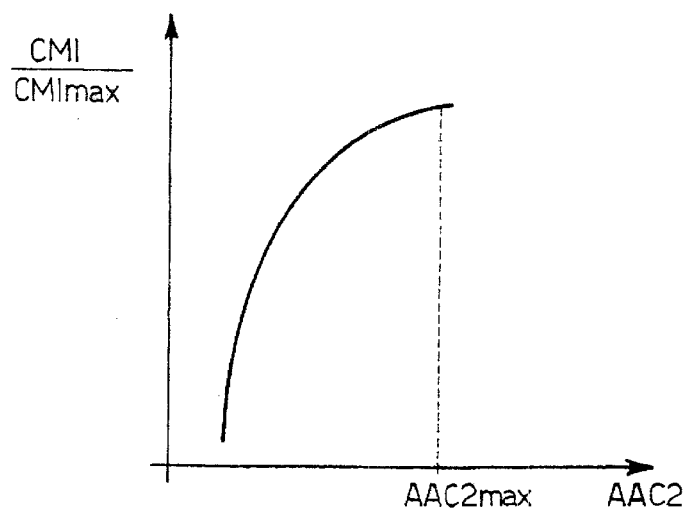
FIG. 4 is a curve which correlates two quantities used by the calculation unit in FIG. 2.

The correction value AAC2 is calculated in the respective calculation block 12, on the basis of the value of the ratio between the engine torque generated CMI, and the maximum engine torque CMIMAX; in particular, the calculation block 12 implements a parabolic curve, which is known in the literature by the name of a "single curve", is illustrated by way of example in FIG. 4, and correlates according to a biunivocal ratio each value of the engine torque generated CMI required and the maximum engine torque CMIMAX, with a respective correction value AAC2 of the spark advance. In fact, it is well known that it is possible to correlate the spark advance applied with the engine torque generated CMI, by means of a curve, the said "single curve", irrespective of the drive point and the parabolic type.

Similarly to what generally takes place in internal combustion engines with an external % EGR circuit, there is determination in the percentage % EGR of inert gas contained in the gas mixture trapped in a cylinder 2; of the state variable of the mixture, which, by means of the correction value AAC1, contributes towards defining the actual value Aaeff of the spark advance. In practice, the percentage % EGR of inert gas determines the spark advance offset (correction value AAC1) to be applied to the "single curve" (correction value AAC2) previously described, in order to guarantee the validity of the "single curve".

The mass % EGR of burnt gas is estimated in the respective estimator block 16, according to the speed of rotation RPM of the engine 1, according to the value VVT of timing at the intake and/or exhaust of the engine 1 (value VVT expressed by the angular correction applied to the valve phase), and according to the pressure difference $\Delta P$ between the exhaust manifold 5 and the intake manifold 3.

The mass % EGR of burnt gas which is trapped in a cylinder 2 at the end of the intake phase is estimated by means of a three-dimensional surface e(RPM, $\Delta P$, VVT) in the domain of the speed of rotation RPM, value VVT of timing at the intake and/or exhaust, and difference $\Delta P$ of pressure between the exhaust manifold 5 and the intake manifold 3.

The implementation in the estimator block 16 of the three-dimensional surface e(RPM, $\Delta P$, VVT) is onerous in terms of occupation of the memory, and thus in terms of cost, of the estimator block 16 itself. In order to reduce the weight of implementation of the three-dimensional surface e(RPM, $\Delta P$, VVT) in the estimator block 16, without losing significantly the consistency of the data obtained, it has been decided to parameterise the three dimensional surface e(RPM, $\Delta P$, VVT) relative to the speed of rotation RPM of the engine 1, by means of orthographic projections of the three-dimensional surface e(RPM, $\Delta P$, VVT), in the domain of the difference $\Delta P$ of pressure and timing value VVT.

The two-dimensional surfaces which are derived from the orthographic projections of the three-dimensional surface e(RPM, $\Delta P$, VVT) are subsequently redefined from a single two-dimensional surface h($\Delta P$, VVT) in the domain of the pressure difference $\Delta p$ and timing value VVT; the orientation of the two-dimensional surface h($\Delta P$, VVT) in the three-dimensional domain of the speed of rotation RPM, timing value VVT, and pressure difference $\Delta P$, depends on the speed of rotation RPM of the engine. In other words, the three-dimensional surface e(RPM, $\Delta P$, VVT) is represented by means of the product of a two-dimensional surface h($\Delta P$, VVT) in the domain of the timing value VVT, and the difference $\Delta p$ of pressure, and a vector g(RPM) in the domain of the speed of rotation RPM.

The above-described reconstruction of the three-dimensional surface e(RPM, $\Delta P$, VVT), by means of the product of a single two-dimensional surface h($\Delta P$, VVT) and a vector g(RPM) is carried out by means of numerical calculation methods which converge in successive approximations, and by applying the criterion of the minimum quadratic error.

The foregoing description is summarised by the following equations:

$$\% \, EGR = e(RPM, \Delta P, VVT) \approx g(RPM) * h(\Delta P, VVT)$$

Figure 3:
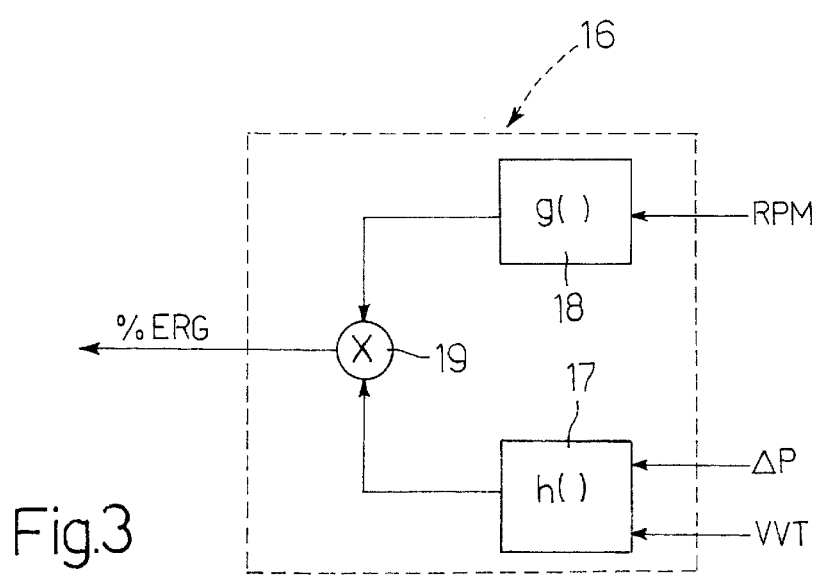
FIG. 3 is a detailed view of a block of the calculation unit in FIG. 2.

The breakdown of the three-dimensional surface e(RPM, $\Delta P$, VVT) by means of the product of the two-dimensional surface h($\Delta P$, VVT) and the vector g(RPM) can be implemented directly in the estimator block 16, with occupation of memory which is relatively reduced. As illustrated in FIG. 3, the estimator block 16 comprises two calculation blocks 17 and 18, which implement respectively the two-dimensional surface h($\Delta P$, VVT) and the vector g(RPM), and a multiplier block 19, which can multiply with one another the values output from the blocks 17 and 18.

In general, the construction of the three-dimensional surface e(RPM, $\Delta P$, VVT) takes place in the stage of design of the calculation unit 9, by means of the use of a series of experimental tests carried out on the engine 1. However, in the specific case of engines which are provided with continuous systems for transformation of the intake/exhaust phase, it is not possible to carry out direct measurement of the quantity % EGR of burnt gas trapped in a cylinder 2, it is therefore necessary to use a model of the engine 1, in order to determine indirectly an estimate of the quantity % EGR of burnt gas trapped in a cylinder 2, at various points of the engine.

In order to construct correctly the three-dimensional surface e(RPM, ΔP, VVT), it is necessary to use modelling of the engine 1, which makes it possible to define an estimate of the latter which is compatible with the motor reactions observed; i.e., in relation to measurable input stimulations, the model of the engine 1 must give rise to responses which can approximate the real responses measured.

One of the engine models which can be used for construction of the three-dimensional surface e(RPM, ΔP, VVT) is that illustrated in FIG. 1, which is in itself known in the literature, and consists of a series of sub-models which represent the intake circuit, filling of the combustion chamber, the combustion process, emptying of the combustion chamber, and the exhaust circuit. In particular, the reconstruction of the estimate % EGR of the inert substance trapped in a cylinder is carried out by means of a simplified model of the fluid mechanics phenomena of filling-emptying of the cylinder 2, and of the combustion; the result obtained cannot represent in absolute terms the real quantity of inert substance trapped in the cylinder at the end of the intake phase, but can more realistically provide a qualitative indication of it, which however is already sufficient to permit sufficiently accurate calculation of the actual value Aaeff of the spark advance.

The mathematical model of the engine is defined by a series of equations (which are known, and are not given in detail), which correlate with one another the characteristic quantities of the engine 1; each equation comprises a number of numerical coefficients, the value of which is determined by means of a series of experimental tests on the engine. In particular, by means of a grid of acquisitions at the points of work of the speed of rotation RPM and engine torque generated CMI, there is identification of the value of the coefficients, such as to obtain in simulation engine reactions which are very close to the real engine reactions.

From the foregoing, it is apparent that use of the indicator % EGR of the rate of inert gas makes it possible to apply the correction AAC1 of the spark advance in a manner which is altogether similar to that which is applied for engines with an external EGR circuit, thus making it possible to re-use the same engine control strategies as those developed for systems with an external EGR circuit, with obvious benefits of standardisation of the engine control strategies.

In general, in a internal combustion engine, in addition to the mass of air collected during the intake stage, the quantity of burnt residual gas (which is trapped inside the cylinder at the end of the exhaust phase, and is altogether inert as far as combustion is concerned), also plays a determining part in definition of the optimum spark advance, since both the quantity and quality of the fuel present in the cylinder at the end of the intake phase affect the speed of propagation of the flame front and the combustion temperature. In particular, the speed of propagation of the flame front which affects in a determining manner the spark advance applicable) for the same new mass (of air) collected, is reduced as the percentage of burnt gas present in the combustion chamber increases.

The presence of a continuous phase transformer at the intake/exhaust modifies both the quantity and quality of the fuel collected, and thus the speed of propagation of the flame front. In fact, in engines with intake/exhaust timing devices which are variable continuously, for the same engine rotation speed, it is possible to obtain the same quantity of mass of air collected in the cylinder, with different intake/exhaust timing values, and the different intake/exhaust timing values correspond to a different mass of inert gas trapped in the cylinder at the end of the exhaust stage.

In accordance with the foregoing description, the theoretical value aath of the spark advance is corrected according to an estimate of the speed of propagation of the flame front, and the estimate of the speed of propagation of the flame front is carried out by using the mass of burnt gas trapped in the cylinder at the end of the intake phase as a state variable.

What is claimed is:

1. Method for correction of the spark advance for an internal combustion engine (1) with a continuous phase transformer at the intake and/or exhaust; for each cylinder (2), the method consisting of calculating a theoretical value (AAth) of the optimum spark advance according to the drive point, calculating a first correction value (AAC1), which depends on the mass (% EGR) of burnt gas trapped in the cylinder (2) at the end of the intake phase, and calculating the actual value (AAeff) of the spark advance, by adding the said first correction value (AAC1) algebraically to the theoretical value (AAth) of the spark advance; the method being characterised in that the first correction value (AAC1) is calculated according to the mass (% EGR) of burnt gas trapped in the cylinder (2) at the end of the intake phase; and the mass (% EGR) of burnt gas trapped in the cylinder (2) at the end of the intake phase being estimated according to the speed of rotation (RPM), according to the timing value (VVT) at the intake and/or exhaust, and according to the pressure difference (ΔP) between the exhaust manifold (5) and the intake manifold (3).

2. Method according to claim 1, wherein the said first correction value (AAC1) is calculated according to the speed of rotation (RPM) of the engine (1), and according to the mass (% EGR) of burnt gas trapped in the cylinder (2) at the end of the intake phase.

3. Method according to claim 1, wherein a second correction value (AAC2) is calculated, which is dependent on the torque value (CMI) generated; the said first and second correction values (AAC1, AAC2) being added algebraically to the said theoretical value (AAth) of the spark advance, in order to calculate the said actual value (AAeff) of the spark advance.

4. Method according to claim 3, wherein the said second correction value (AAC2) is obtained on the basis of the value of the ratio between the engine torque generated (CMI) and the maximum engine torque (CMIMAX); the said second correction value (AAC2) and the value of the said ratio between the engine torque generated (CMI) and the maximum engine torque (CMIMAX) being correlated to one another via the curve of a parabolic type known as the "single curve".

5. Method according to claim 1, wherein, before the said, actual value (AAeff) of the spark advance is applied to the engine (1), it is processed by means of a saturation function, in order to maintain the actual value (AAeff) itself within an interval which is limited both below and above.

6. Method according to claim 1, wherein the mass % EGR) of burnt gas trapped in the cylinder (2) at the end of the intake phase is estimated by means of a three-dimensional surface (e()) in the domain of the speed of rotation (RPM) timing value (VVT) at the intake and/or exhaust, and pressure difference (ΔP) between the exhaust manifold (5) and the intake manifold (3).

7. Method according to claim 6, wherein the said three-dimensional surface (e()) is represented by means of the product of a two-dimensional surface (h() in the domain of the timing value at the intake and/or exhaust, and the pressure difference (ΔP) between the exhaust manifold (5) and the intake manifold (3), and a vector (g(), in the domain of the speed of rotation (RPM).

8. Method according to claim 7, wherein the breakdown of the said three-dimensional surface (e()) in the product of the said two-dimensional surface (h()), and the said vector (g()), is carried out according to the technique of the quadratic minimums.

9. Method according to claim 6, wherein the said three-dimensional surface (e()) is constructed by using a mathematical model of the engine (1), which is defined by a series of equations which correlate with one another the characteristic values of the engine (1); each equation comprising a number of numerical coefficients, the value of which is determined by means of a series of experimental tests on the engine (1); the mathematical model providing determination of the mass (% EGR) of burnt gas trapped in the cylinder (2) at the end of the intake phase, according to the values of the speed of rotation (RPM), timing value (VVT) at the intake and/or exhaust, and pressure difference ($\Delta P$) between the exhaust manifold (5) and intake manifold (3).

10. Method for correction of the spark advance for an internal combustion engine (1) with a continuous phase transformer at the intake and/or exhaust; for each cylinder (2), the method consisting of calculating a theoretical value (AAth) of the optimum spark advance according to the drive point, calculating a correction value, which depends on the estimate of the speed of propagation of the flame front, and calculating the actual value (AAeff) of the spark advance, by adding the said first correction value (AAC1) algebraically to the theoretical value (AAth) of the spark advance; the said estimate of the speed of propagation of the flame front being carried out by using the mass (% EGR) of burnt gas trapped in the cylinder (2) at the end of the intake phase as a state variable.

\* \* \* \* \*